United States Patent
Yamanaka

(10) Patent No.: US 6,205,108 B1
(45) Date of Patent: Mar. 20, 2001

(54) OPTICAL HEAD FOR REPRODUCING OR RECORDING A COMPACT OR SIMILAR DISK

(75) Inventor: Yutaka Yamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/994,579

(22) Filed: Dec. 19, 1997

(30) Foreign Application Priority Data

Dec. 26, 1996 (JP) .................................... 8-347216

(51) Int. Cl.⁷ ........................................... G11B 7/00
(52) U.S. Cl. ............................. 369/112; 369/58
(58) Field of Search .................... 369/110, 112, 369/94, 44.23, 44.37, 58

(56) References Cited

U.S. PATENT DOCUMENTS

| | | |
|---|---|---|
| 5,349,592 | 9/1994 | Ando . |
| 5,446,565 * | 8/1995 | Komma et al. ............... 369/112 |
| 5,600,614 * | 2/1997 | Katayama ................. 369/44.23 |
| 5,734,637 * | 3/1998 | Ootaki et al. ............... 369/110 |
| 5,856,965 * | 1/1999 | Tsuchiya et al. ............. 369/110 |

FOREIGN PATENT DOCUMENTS

| | | |
|---|---|---|
| 0537904A2 | 4/1993 | (EP) . |
| 0545133A2 | 6/1993 | (EP) . |
| 0731457A2 | 9/1996 | (EP) . |
| 0762398A1 | 3/1997 | (EP) . |
| 0803867A2 | 10/1997 | (EP) . |
| 058009 | 3/1911 | (JP) . |
| 3-52132 | 3/1991 | (JP) . |
| 5-6569 | 1/1993 | (JP) . |
| 5-73945 | 3/1993 | (JP) . |
| 5-144073 | 6/1993 | (JP) . |
| 6-203405 | 7/1994 | (JP) . |
| 7-57271 | 3/1995 | (JP) . |
| 7-98431 | 4/1995 | (JP) . |
| 7-302437 | 11/1995 | (JP) . |
| 7-65409 | 11/1995 | (JP) . |
| 8-17068 | 1/1996 | (JP) . |
| 8-55363 | 2/1996 | (JP) . |
| 8-77594 | 3/1996 | (JP) . |
| 8-153336 | 6/1996 | (JP) . |

OTHER PUBLICATIONS

Document No: 5–234122; Date: Sep. 10, 1993; Country: Japan.

A Compact–Disc–Compatible Digital Versatile Disc Pickup Using Annular Mask, Jpn. J. Appl. Phys. vol. 36 (1997) pp. 486–400, Part 1. No. 1B, Jan. 1997.

\* cited by examiner

*Primary Examiner*—Thang V. Tran
(74) *Attorney, Agent, or Firm*—Laff, Whitesel & Saret, Ldt.; J. Warren Whitesel

(57) ABSTRACT

An optical head of the present invention applicable to an optical disk drive includes a light-transmitting phase shifting device. The phase shifting device reduces aberration ascribable to a difference in the thickness of the substrate of an optical disk. This not only insures the effective reproduction of data out of optical disks having different substrate thicknesses, but also guarantees a sufficient quantity of light representative of a reproduced signal and a sufficient lens numerical aperture. The optical head therefore achieves a desirable reproduced signal characteristic.

6 Claims, 3 Drawing Sheets

OPTICAL HEAD FOR REPRODUCING OR RECORDING A COMPACT OR SIMILAR DISK

BACKGROUND OF THE INVENTION

The present invention relates to an optical disk drive for driving a compact disk or similar optical disk and, more particularly, to an optical head capable of recording and reproducing data out of optical disks each having a substrate of particular thickness.

It is a common practice with an optical disk to form a transparent substrate having a preselected thickness in order to protect the recording surface of the disk of the order of microns. Rays issuing from an optical head form a fine spot on the recording surface of the disk by being transmitted through the transparent substrate. Because the resulting converged beam propagates through the transparent substrate which is parallel and flat, wavefront aberration occurs in the beam in accordance with the substrate thickness. The wavefront aberration refers to the deviation of the equiphase wave surface of the converged beam from a spherical surface. Should the wavefront aberration increase, the diameter of the converged spot would exceed a diffraction limit and would thereby degrade the recording and reproducing characteristic. In light of this, a lens included in the optics of an optical head is so designed as to correct the wavefront aberration, so that a fine spot close to the diffraction limit can be formed on the recording surface.

Generally, the substrate of an optical disk has a particular thickness matching with a desired application. Because the wavefront aberration stated above depends on the thickness of the substrate, the conventional optical head cannot record or reproduced data in or out of optical disks other than one having a particular substrate thickness. That is, the conventional optical head cannot meet the demand for the recording and reproduction with two or more different optical disks having different substrate thicknesses.

To solve the above problem, a mask area may be formed on an objective lens, as proposed in the past. This, however, brings about a problem that the mask area existing on the lens at all times reduces the optical efficiency. In addition, the mask area reduces the numerical aperture applicable to the head.

Technologies relating to the present invention are disclosed in, e.g., "A Compact-Disk-Compatible Digital Versatile Disk Pickup Using Annular Mask" by Chul Woo Lee et al, Jpn. J. Appl. Phys., Vol. 36 (1997), pp. 486–490 and Japanese Patent Application Laid-Open Nos. 3-52132, 5-6569, 5-73945, 6-203405, 7-57271, 7-65409, 7-98431, 7-302437, and 8-77594.

SUMMARY OF THE INVENTION

It is therefore an object of the present invention to provide an optical head for an optical disk drive and capable of reproducing data out of optical disks having different substrate thicknesses, and insuring a high optical efficiency and a large numerical aperture.

In accordance with the present invention, an optical head includes a laser having a wavelength $\lambda$, an objective lens for causing a beam issuing from the laser to be transmitted through the substrate of an optical disk having a preselected thickness and to form a fine spot on the recording surface of the optical disk, and optics for sensing the resulting reflection from the recording surface of the optical disk. A light-transmitting phase shifting device extends along an annular zone symmetrical with respect to the optical axis of the beam incident to the objective lens, and shifts the phase of the beam by $0.3\lambda$ or less.

Also, in accordance with the present invention, an optical head includes a laser having a wavelength $\lambda$, an objective lens for causing a beam issuing from the laser to be transmitted through the substrate of an optical disk having a preselected thickness and to form a fine spot on the recording surface of the optical disk, and optics for sensing the resulting reflection from the recording surface of the optical disk. A light-transmitting phase shifting device extends along an annular zone symmetrical with respect to the optical axis of the beam incident to the objective lens, and effects a phase shift selectively variable to zero or to a preselected value other than zero in response to a signal input from the outside of the head.

Further, in accordance with the present invention, an optical head includes a laser having a first wavelength for reproducing data out of an optical disk whose substrate has a first thickness, a laser having a second wavelength for reproducing data out of an optical disk whose substrate has a second thickness, a wavelength combiner for causing each of beams issuing from the lasers to propagate in the same direction, an objective lens for causing each of the beams issuing from the lasers to be transmitted through the substrate of the optical disk having a particular thickness and to form a fine spot on the recording surface of the optical disk, and optics for sensing the resulting reflection from the recording surface of the optical disk. A light-transmitting phase shifting device extends along an annular zone symmetrical with respect to the optical axis of the beam incident to the objective lens, and effects a substantially zero phase shift with the beam having the first wavelength, but shifts the phase of the beam having the second wavelength by a value other than zero.

Moreover, in accordance with the present invention, an optical head includes a laser, an objective lens for causing a beam issuing from the laser to be transmitted through the substrate of an optical disk having a preselected thickness and to form a fine spot on the recording surface of the optical disk, and optics for sensing the resulting reflection from the recording surface of the optical disk. A plurality of phase shifting devuces extend along an annular zone symmetrical with respect to the optical axis of the beam incident to the objective lens, and shifts the phase of each incident beam by a particular amount.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

To better understand the present invention, brief reference will be made to a conventional optical disk drive, shown in FIG. 1. Because the substrate of an optical disk has a particular thickness matching with a desired application, the amount of correction of the wavefront aberration depends on the thickness of the substrate, as stated earlier. With a conventional optical head, it is impractical to record and reproduce data out of two or more different kinds of optical disks each having a particular substrate thickness.

Figure 1:
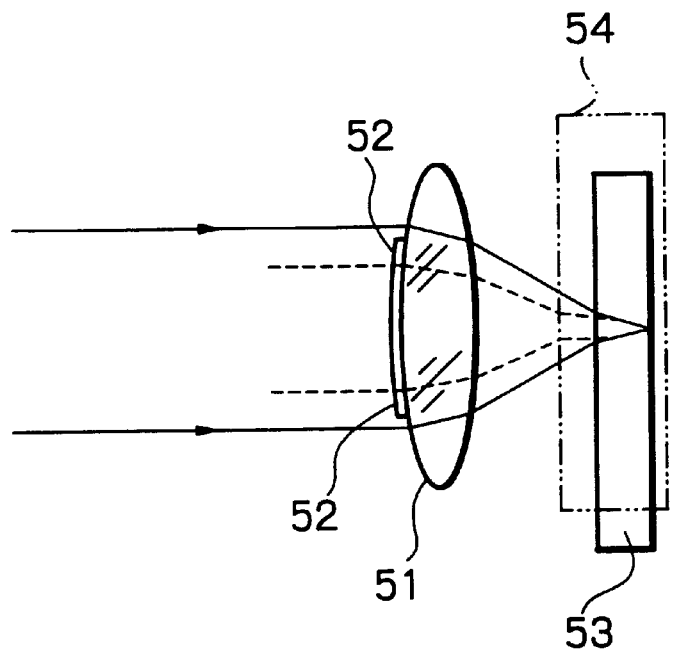
FIG. 1 shows a conventional optical head.

In light of the above, as shown in FIG. 1, the conventional optical disk drive includes an objective lens 51 provided with an annular mask area 52. The objective lens 51 itself is so designed as to form an optimal spot on a first optical disk 53 whose substrate has a first thickness. However, when the lens 51 is used to reproduce data out of a second optical disk 54 whose substrate has a second thickness, aberration occurs due to the difference in substrate thickness and sequentially increases toward the perimeter of the lens 51. The annular mask area 52 masks the zone of the lens 51 where the aberration begins to increase. As a result, light propagating through the lens 51 inside of the mask area 52 is allowed to form a desirable spot even on the second disk 54. Light outside of the mask area 52 is scattered due to great aberration and has little influence on the shape of the spot.

However, because the mask area 52 always exists on the lens 51, it intercepts even the rays directed toward the first disk 53 and thereby reduces the optical efficiency. Moreover, only the rays propagating through the lens 51 inside of the mask area 52 are available for the second disk 54, limiting the numerical aperture applicable to the above arrangement.

Preferred embodiments of the optical head for an optical disk drive in accordance with the present invention will be described hereinafter. First, I found the following in searching for a solution to the above problems.

Figure 2:
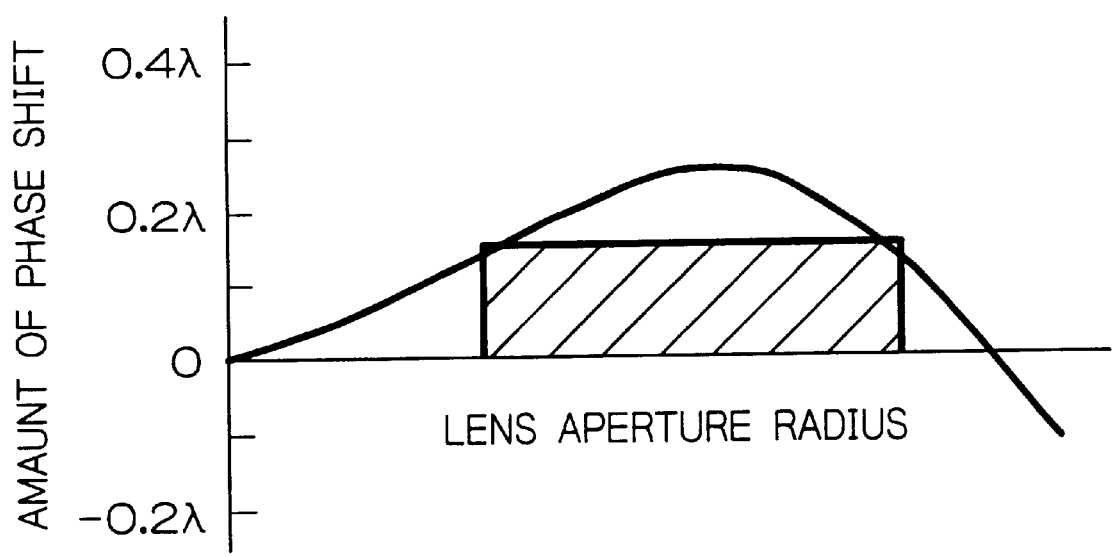
FIG. 2 shows a relation between the radial position of the aperture of an objective lens and the phase difference occurring there.

When spherical aberration occurs due to a difference in the substrate thickness of an optical disk, the position where a focused spot image has the smallest diameter is deviated from the designed focal point of an objective lens in the focus direction. This is because the spherical aberration is partly corrected by aberration derived from the shift of the focal point. FIG. 2 shows a curve representative of the combined aberration of the spherical aberration ascribable to the substrate thickness and the aberration ascribable to the shift of the focal point and determined under conditions implementing a spot image of smallest diameter. In FIG. 2, the origin indicates the center of an objective lens while the abscissa indicates the radius of the aperture of the lens. The combined aberration is represented by a phase deviation (phase difference) from the ideal wavefront free from aberration and is greatest around the center of the radius of the lens aperture. It follows that if the aberration is corrected by a certain amount over the range indicating by hatching in FIG. 2, the aberration can be noticeably reduced over the entire lens. The curve shown in FIG. 2 was obtained with an objective lens whose numerical aperture was 0.6 and a variation of substrate thickness of 0.6 mm.

On the other hand, as for a first optical disk on which the design of the objective lens is based, the aberration of the entire lens increases due to the above additional correction. However, if the absolute value of the amount of phase shift (aberration correction amount) is selected to be $0.3\lambda$ or less in terms of laser wavelength, the reproduction characteristic does not noticeably vary with the first disk. This was proved by a series of experiments in which the aberration was actually corrected with the first disk.

In accordance with the present invention, light-transmitting phase shifting means is used to implement the reproduction of data out of optical disks each having a particular substrate thickness. The phase shifting means obviates the conventional loss of light and insures substantially the same numerical aperture available for the first disk even for the second disk.

1st Embodiment

Figure 3:
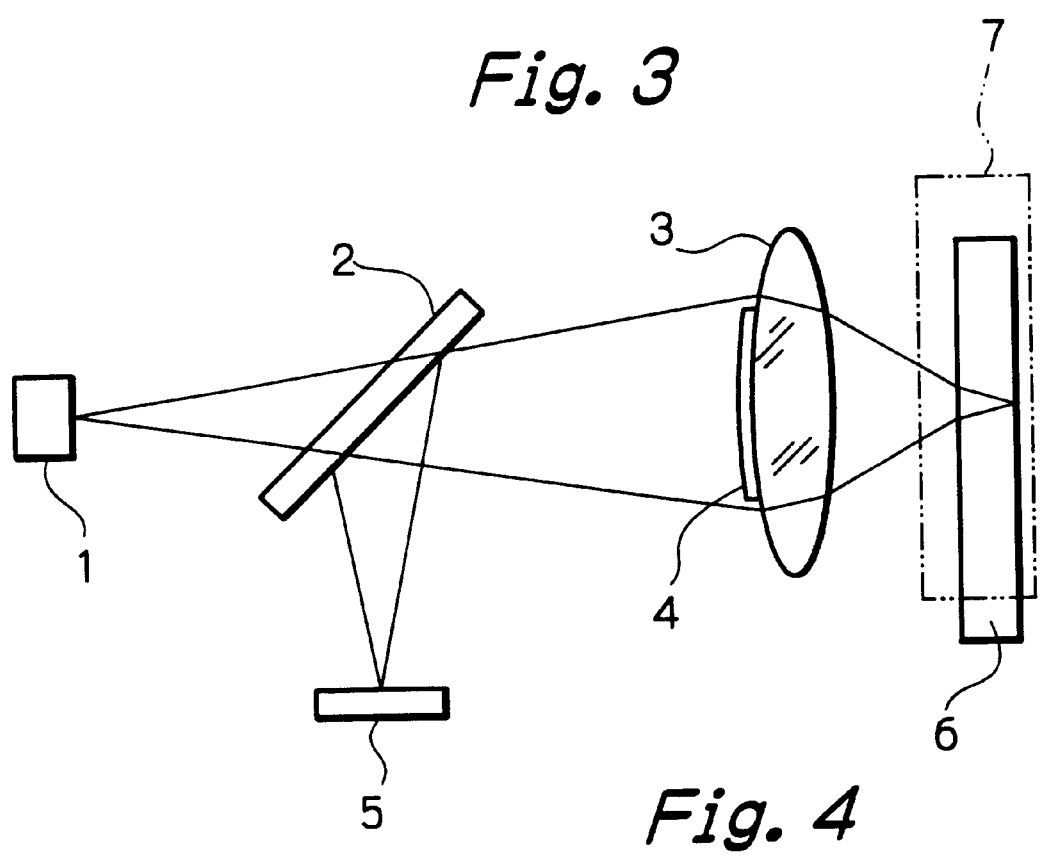
FIG. 3 shows a first embodiment of the optical head in accordance with the present invention.
Figure 4:
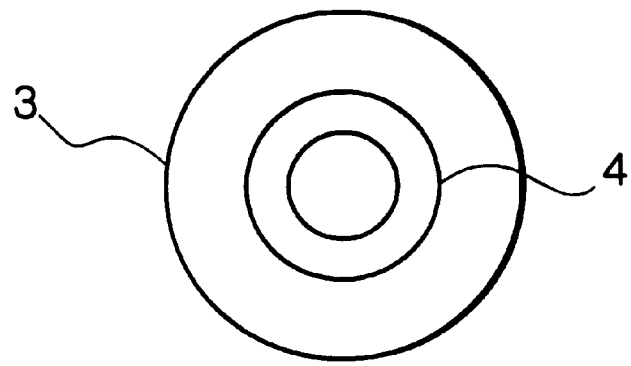
FIG. 4 shows an arrangement of phase shifting means included in the first embodiment.

Referring to FIGS. 3 and 4, a first embodiment of the present invention will be described. FIG. 3 shows an essential part of an optical head. As shown, the optical head has a beam splitter 2 and an objective lens 3 sequentially arranged in this order in the direction in which a laser 1 emits rays. A reflection from the beam splitter 2 is incident to an optical sensor 5. The reference numerals 6 and 7 designate optical disks each having a particular substrate thickness.

Phase shifting means 4 is provided on the surface of the objective lens 3 that faces the laser 1. The phase shifting means 4 extends along an annular zone symmetrical with respect to the optical axis of the beam incident to the lens 3. As shown in FIG. 4, the phase shifting means 4 is implemented by an annular light-transmitting film formed of a dielectric material. In the illustrative embodiment, the phase shifting means 4 is formed on a circle. The amount of phase shift available with the phase shifting means 4 is selected to be $0.3\lambda$ or less in terms of laser wavelength. The lens 3 is designed in matching relation to the first disk 6 having a smaller substrate thickness than the second disk 7.

The beam issuing from the laser 1 is incident to the lens 3 having the phase shifting means 4 and is shifted in phase by a preselected amount thereby. The beam propagated through the lens 3 is focused onto one of the first and second disks 6 and 7. Assume that the phase shifting means 4 is implemented by a 0.26 $\mu$m thick layer of dielectric material having a refractive index of 1.5. Then, for a beam source whose wavelength $\lambda$ is 0.65 $\mu$m, the phase shifting means 4 shifts the phase of the beam by $0.2\lambda$. On the other hand, a reflection from the disk 6 or 7 is split by the beam splitter 2 and directed toward the optical sensor 5. The deviation of the spot position and information signal are detected by conventional optics.

Experiments using the illustrative embodiment showed that data can be read out of optical disks having different substrate thicknesses with a minimum of aberration. In addition, because the phase shifting means 4 was light-transmitting, a sufficient optical efficiency and a sufficient numerical aperture were achieved with each disk, providing a reproduced signal with a desirable characteristic.

Even an optical disk whose substrate thickness is intermediate between the substrate thicknesses of the two disks 6 and 7 can, of course, be reproduced by the above arrangement because the resulting aberration is intermediate between the aberrations particular to the disks 6 and 7. This is also true with optics including a collimator lens and an objective lens separate from each other. To provide an objective lens to be produced by molding with the phase shifting means 4, a mold may be formed with a step complementary in shape to the phase shifting means 4 beforehand. This allows the phase shifting means 4 to be molded integrally with the lens. Further, if the amount of phase shift to be effected by the phase shifting means 4 is variable, data can be reproduced under almost optimal conditions at all times.

2nd Embodiment

A phase shift area may be provided independently of an objective lens, in which case phase shifting means will advantageously be located between the objective lens 3 and the beam splitter 2 shown in FIG. 3. In such a case, there can be used even a phase difference based on hologram analysis. The second embodiment relates to this kind of phase shifting means and will be described with reference to FIG. 5.

Figure 5:
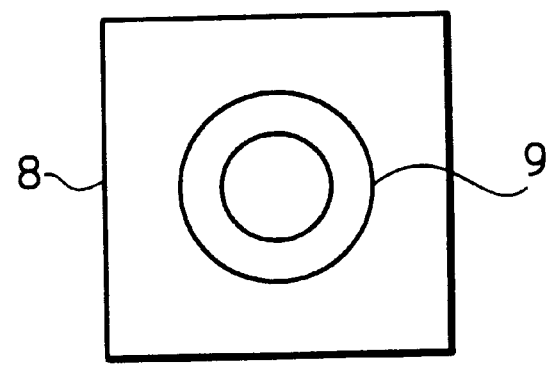
FIG. 5 shows phase shifting means representative of a second embodiment of the present invention.

As shown in FIG. 5, phase shifting means is implemented by a flat liquid crystal (LC) device 8. The LC device 8 includes an annular transparent electrode zone 9 symmetrical with respect to the axis of the beam incident to the objective lens 3, FIG. 3. In this configuration, the amount of phase shift of a beam propagating through the LC device 8 varies in accordance with a voltage applied to the device 8. To record or reproduce data in or out of the first disk 6, no voltage is applied to the LC device 8 so as to effect no phase shift. To record or reproduce data in or out of the second disk 7, a voltage is applied to the LC device 8 in order to produce a relative phase difference in the annular zone 9. Again, the objective lens 3, FIG. 3, is designed on the basis of the substrate thickness of the first disk 6.

With this embodiment, therefore, it is possible to optimize the amount of phase shift for each of optical disks having different substrate thicknesses and therefore to output a desirable reproduced signal, as determined by experiments. It follows that the embodiment is practicable even if the amount of phase shift is corrected by the phase shifting means by more than 0.3λ. If desired, the LC device 8 may be replaced with an electrooptical crystal.

3rd Embodiment

Figure 6:
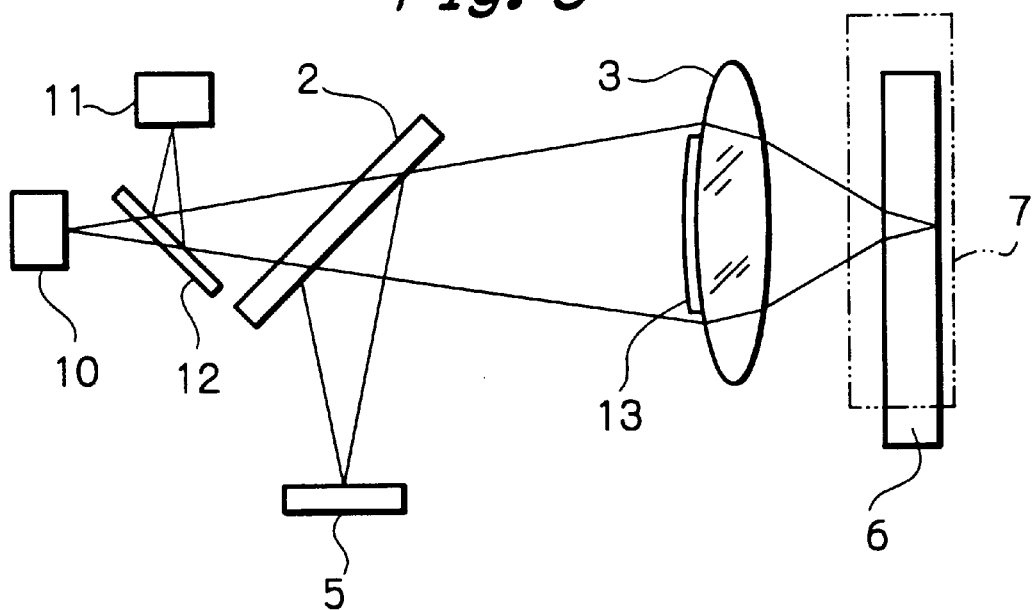
FIG. 6 shows a third embodiment of the present invention.

FIG. 6 shows a third embodiment of the present invention. As shown, a wavelength combiner 12 and the beam splitter 2 and objective lens 3 are sequentially arranged in this order in the direction in which a first laser 10 emits a beam. A second laser It emits a beam toward the wavelength combiner 12. The beam from the second laser 11 is incident to the wavelength combiner 12 perpendicularly to the beam issuing from the first laser 10. The optical sensor 5 and first and second disks 6 and 7 are also shown in FIG. 6.

The first laser 10 is driven when data should be read out of the first disk 6 while the second laser 11 is driven data should be read out of the second disk 7. The wavelength combiner 12 is so positioned as to steer each of the beams to issue from the lasers 10 and 11 toward the objective lens 3. Phase shifting means 13 is provided on the surface of the lens 3 facing the laser 10 and extends along an annular zone symmetrical with respect to the axis of the beam incident to the lens 3. The beam incident to the lens 3 via the wavelength combiner 12 is shifted in phase by a preselected amount by the phase shifting means 13 and then focused onto the disk 6 or 7. The resulting reflection from the disk 6 or 7 is separated by the beam splitter 2 and then incident to the sensor 5.

Assume that the first laser 10 has a wavelength λ1. Then, the phase shifting means 13 is implemented as a dielectric film which shifts the phase of the beam issuing from the laser 10 by an integral multiple of λ1. For example, assume that the wavelength λ1 is 0.65 μm, that the second laser 11 has a wavelength λ2 of 0.78 μm, and that a dielectric material having a refractive index of 1.5 is deposited on the lens 3 to a thickness of 1.3 μm so as to form the phase shifting means 13. Then, the amount of phase shift of the beam whose wavelength is 0.65 μm is equivalent to zero because it is an integral multiple of the wavelength. On the other hand, the beam having the wavelength of 0.78 μm is shifted in phase by about −0.17λ. In this case, the lens 3 is designed in matching relation to the first laser 10.

As stated above, the phase shifting means 13 does not shift the phase of the beam issuing from the first laser 10, but shifts the phase of the beam issuing from the second laser 11. Therefore, by switching the laser to be driven in accordance with the substrate thickness of the disk 6 or 7, it is possible to reduce the aberration disk by disk and therefore to more desirably read data out of optical disks each having a particular substrate thickness. In addition, because the phase shifting means 13 transmits light, it does not reduce the quantity of reproduced light at all and insures a sufficient numerical aperture.

To further increase the amount of phase shift, the dielectric layer constituting the phase shifting means 13 may be increased in thickness, or a material having a particular dielectric constant may be assigned to each laser wavelength. The wavelength combiner 12 and beam splitter 2 may be replaced with each other, in which case a particular optical sensor will be assigned to each of the lasers 10 and 11. Because the amount of phase shift is determined by a relative value, the dielectric film may be formed in a part of the lens 3 other than the annular phase shift zone. This is, in the apparent sense, equivalent to causing a phase shift of 0.17λ to occur in the phase shift zone.

4th Embodiment

Figure 7:
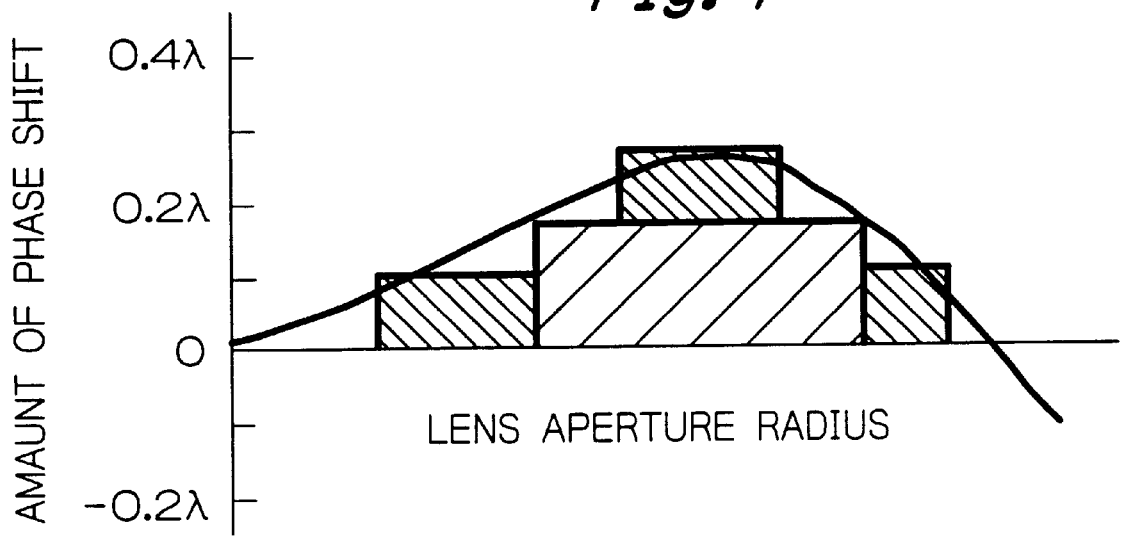
FIG. 7 shows a fourth Embodiment of the present invention.

To further reduce the aberration ascribable to the substrate thickness difference, the annular phase shift zone of any one of the preceding embodiments may be divided into subzones in the radial direction, and a particular phase shift may be assigned to each subzone. A fourth embodiment to be described with reference to FIG. 7 uses this kind of configuration. In FIG. 7, the origin is representative of the center of the annular phase shifting means while the abscissa and ordinate are respectively representative of the radius of the lens aperture and the phase difference. In FIG. 7, blocks indicated by hatching are representative of the section of the annular phase shifting means.

As shown, a phase shift film indicated by rough hatching is formed on a lens, not shown, and then the other phase shift film indicated by fine hatching is formed. As a result, five consecutive subzones not continuous in the amount of phase shift (film thickness) are formed, further reducing the residual aberration.

While the substrate of the first disk has been shown and described as being thicker than the substrate of the second disk in the above embodiments, the embodiments hold true except for the reversal of the signs even when the above relation between the first and second disks is inverted.

The phase shift is determined by a relative value, as stated previously in relation to the third embodiment. Therefore, the phase shifting means may be provided in the peripheral zone around the annular zone. This is equivalent to causing a negative phase shift to occur in the phase shift area.

In the illustrative embodiments, the phase shifting means is implemented by a dielectric film. Alternatively, a lens or a suitable transparent sheet may be etched in an annular configuration in order to effect a (negative) phase shift.

Figure 8:
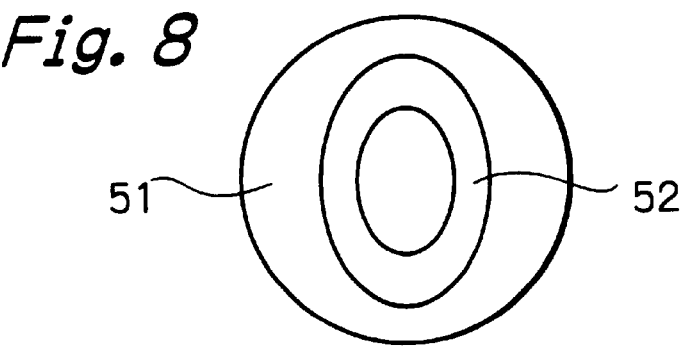
FIG. 8 shows a modification of the arrangement of the phase shifting means included in any one of the illustrative embodiments.

As shown in FIG. 8, the phase shifting means of any one of the illustrative embodiments may be provided with an oval shape. With this configuration, it is possible to produce a particular beam shape in each of the track direction of an optical disk and the direction perpendicular thereto. Therefore, an optimal phase shift condition can be set for each track pitch and each linear track density.

In summary, it will be seen that the present invention provides an optical head for an optical disk drive and having various unprecedented advantages, as enumerated below.

(1) Light-transmitting, phase shifting means reduces aberration ascribable to a difference in the substrate thickness of an optical disk. This not only insures the effective reproduction of data out of optical disks having different substrate thicknesses, but also guarantees a sufficient quantity of light representative of a reproduced signal and a sufficient lens numerical aperture. The optical head therefore achieves a desirable reproduced signal characteristic.

(2) The amount of phase shift of the phase shifting, means is optimally variable in accordance with the substrate thickness of an optical disk, further enhancing the reproduced signal characteristic.

(3) Two lasers each having a particular wavelength are selectively driven in accordance with the substrate thickness of an optical disk. This allows the amount of shift of the phase shifting means to be optimally varied in such a manner as to effectively reduce aberration. This is also successful to further enhance the reproduced signal characteristic.

(4) A plurality of phase shifting means each effecting a particular amount of phase shift are arranged in a phase shift area. It is therefore possible to reduce aberration flexibly in accordance with the aberration distribution in the radial direction of the aperture of an objective lens.

(5) The phase shifting means is provided on the surface of the objective lens, reducing the size of the optical head.

(6) The phase shifting means is implemented as a dielectric film which is relatively low cost.

Various modifications will become possible for those skilled in the art after receiving the teachings of the present disclosure without departing from the scope thereof.

What is claimed is:

1. An optical head comprising:
    a laser having a wavelength $\lambda$;
    an objective lens for causing a beam issuing from said laser to be transmitted through a substrate of an optical disk having a preselected first thickness and to form a fine spot on a recording surface of the optical disk;
    optics for sensing a resulting reflection from the recording surface of the optical disk; and
    light-transmitting phase shifting means comprising a dielectric film having a preselected second thickness extending along an annular zone which is symmetrical with respect to an optical axis of the beam incident to said objective lens, said phase shifting means shifting a phase of the beam by $0.3\lambda$ or less responsive to a detection of a thickness of said optical disk other than said preselected first thickness.

2. An optical head as claimed in claim 1, wherein said phase shifting means is provided on a surface of said objective lens.

3. An optical head comprising:
    a laser having a wavelength $\lambda$;
    an objective lens for causing a beam issuing from said laser to be transmitted through a substrate of an optical disk having a preselected thickness and to form a fine spot on a recording surface of the optical disk;
    optics for sensing a resulting reflection from the recording surface of the optical disk; and
    light-transmitting phase shifting means extending along an annular zone symmetrical with respect to an optical axis of the beam incident to said objective lens, said phase shifting means effecting a phase shift in response to a detection of a thickness other than said preselected thickness, said phase shift being selectively variable to zero or to a preselected value other than zero in response to a signal input from outside of said optical head.

4. An optical head as claimed in claim 3, wherein said phase shifting means comprises a dielectric film.

5. An optical head as claimed in claim 3, wherein said phase shifting means is provided on a surface of said objective lens.

6. An optical head as claimed in claim 5, wherein said phase shifting means comprises a dielectric film.

* * * * *